US012703345B2

(12) United States Patent
Shupe et al.

(10) Patent No.: US 12,703,345 B2
(45) Date of Patent: Aug. 11, 2026

(54) DYNAMIC TORQUE FILLING

(71) Applicant: GM Global Technology Operations LLC, Detroit, MI (US)

(72) Inventors: Todd R. Shupe, Milford, MI (US); Alexandre O. Korobkine, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 18/429,909

(22) Filed: Feb. 1, 2024

(65) Prior Publication Data

US 2025/0249886 A1 Aug. 7, 2025

(51) Int. Cl.
*B60W 20/13* (2016.01)

(52) U.S. Cl.
CPC ....... *B60W 20/13* (2016.01); *B60W 2510/244* (2013.01); *B60W 2520/125* (2013.01); *B60W 2540/10* (2013.01); *B60W 2710/083* (2013.01)

(58) Field of Classification Search
CPC ........... B60W 20/13; B60W 2510/244; B60W 2520/125; B60W 2540/10; B60W 2710/083; B60W 10/08; Y02T 10/62
See application file for complete search history.

(56) References Cited

U.S. PATENT DOCUMENTS 8,682,519 B2 * 3/2014 Maier .................. B60W 20/10 701/55
11,268,582 B2 3/2022 Ravichandran et al.
2017/0137012 A1* 5/2017 Mao ......................... B60K 6/52
2020/0031216 A1* 1/2020 Zhou ..................... B60W 20/00
2022/0379872 A1* 12/2022 Morton ................. B60W 10/26
(Continued)

FOREIGN PATENT DOCUMENTS

CN 101445104 A * 6/2009 ........ B60W 50/0097
CN 101486345 B * 3/2013 .......... B60W 30/146
(Continued)

OTHER PUBLICATIONS

CN_101486345_B_I_translation (Year: 2013).*
(Continued)

*Primary Examiner* — Kyle T Johnson
(74) *Attorney, Agent, or Firm* — CANTOR COLBURN LLP

(57) ABSTRACT

A system for controlling torque in a vehicle includes first and second propulsion systems, the first propulsion system including a combustion engine configured to drive a primary axle, the second propulsion system including an electric motor configured to drive a secondary axle, where the first propulsion system and the primary axle are mechanically independent from the second propulsion system and the secondary axle. A controller is configured to perform a method that includes estimating a first amount of torque applied to the primary axle in response to a primary axle torque request, determining a difference between the first amount of torque applied to the primary axle and the primary axle torque request, and based on the difference exceeding a selected threshold, calculating a dynamic fill torque and applying a second amount of torque to the secondary axle via the electric motor according to the calculated dynamic fill torque.

20 Claims, 5 Drawing Sheets

(56) References Cited

U.S. PATENT DOCUMENTS

2023/0166746 A1* 6/2023 Hancock ............ B60W 30/182
701/22
2025/0249886 A1* 8/2025 Shupe .................. B60W 20/13
2025/0249888 A1* 8/2025 Gwidt ...................... B60K 6/52
2026/0014976 A1* 1/2026 Lu ........................ B60W 20/10

FOREIGN PATENT DOCUMENTS

CN 102358163 B * 3/2014
CN 111433066 A * 7/2020 ............ F16H 63/04
CN 108382186 B * 9/2020 ............ B60K 6/442
CN 121316810 A * 1/2026 ............ B60W 10/08
DE 102011056600 A1 * 6/2013 ............ B60W 30/02
EP 3826874 B1 * 10/2023 ............... B60K 6/52
GB 2608054 A * 12/2022 ............ B60W 20/00
GB 2608306 A * 12/2022 ............ B60W 50/02

OTHER PUBLICATIONS

CN_102358163_B_I_translation (Year: 2014).*
CN_108382186_B_I_translation (Year: 2020).*
CN_111433066_A_I_translation (Year: 2020).*
DE_102011056600_A1_I_translation (Year: 2013).*
CN-121316810-A translation (Year: 2026).*
CN-101445104-A translation (Year: 2009).*
German Office Action for German Application No. 102024108807.9; dated Nov. 26, 2024; 6 pages.

* cited by examiner

DYNAMIC TORQUE FILLING

INTRODUCTION

The subject disclosure relates to vehicles, and more specifically, to systems, devices and methods for control of vehicle propulsion.

Vehicles, including gasoline and diesel power vehicles, fuel cell vehicles, as well as electric and hybrid electric vehicles, feature a variety of propulsion systems. Different propulsion systems have different response times (i.e., delays in translating a driver's torque request to actual acceleration or deceleration). For example, internal combustion engine (ICE) systems have a delayed response due to a number of factors, such as ignition timing, throttle valve parameters and others. It is desirable to provide systems that are capable of compensating for such delayed responses in order to increase drivability, improve responsiveness and improve a driver's overall experience.

SUMMARY

In one exemplary embodiment, a system for controlling torque in a vehicle includes a controller connected to a first propulsion system and a second propulsion system of the vehicle, the first propulsion system including a combustion engine configured to drive a primary axle, the second propulsion system including an electric motor configured to drive a secondary axle, where the first propulsion system and the primary axle are mechanically independent from the second propulsion system and the secondary axle. The controller is configured to perform a method that includes estimating a first amount of torque applied to the primary axle in response to a primary axle torque request, determining a difference between the first amount of torque applied to the primary axle and the primary axle torque request, and based on the difference exceeding a selected threshold, calculating a dynamic fill torque and applying a second amount of torque to the secondary axle via the electric motor according to the calculated dynamic fill torque.

In addition to one or more of the features described herein, the primary axle torque request is a shaped torque request determined based on a vehicle operating mode.

In addition to one or more of the features described herein, the dynamic fill torque is configured as a dynamic fill torque profile, the dynamic fill torque profile calculated by limiting the shaped torque request based on the difference.

In addition to one or more of the features described herein, the primary axle torque request is selected from a torque request provided by a control system, and an intended torque request, the intended torque request based on driver inputs applied to an acceleration pedal, the driver inputs including at least one of a position of the acceleration pedal and a movement of the acceleration pedal.

In addition to one or more of the features described herein, the difference is between the estimated first amount of torque and the intended torque request.

In addition to one or more of the features described herein, the controller is configured to initiate the method based on at least one activation criteria, the activation criteria including a minimum displacement of a pedal, a minimum magnitude of the first amount of torque being applied to the primary axle, and a minimum rate of change of the first amount of torque.

In addition to one or more of the features described herein, the controller is configured to limit a magnitude and/or rate of the second amount of torque.

In addition to one or more of the features described herein, the method includes limiting the second amount of torque based on at least one of: a state of charge of a battery assembly connected to the electric motor, a lateral acceleration, a vehicle operating mode and a capacity of the secondary axle.

In addition to one or more of the features described herein, the vehicle includes a battery assembly connected to the electric motor, and the controller is configured to cease applying the second amount of torque based on a state of charge of the battery assembly being below a state of charge threshold.

In addition to one or more of the features described herein, the method includes calculating a total torque amount by summing the dynamic fill torque and the first amount of torque, and eliminating application of the second amount of torque based on the primary axle torque request exceeding the total torque amount for a selected time period.

In another exemplary embodiment, a method of controlling torque in a vehicle includes detecting a primary torque request for applying torque to a primary axle of the vehicle, the vehicle including a first propulsion system and a second propulsion system, the first propulsion system including a combustion engine configured to drive a primary axle, the second propulsion system including an electric motor configured to drive a secondary axle, where the first propulsion system and the primary axle are mechanically independent from the second propulsion system and the secondary axle. The method also includes estimating a first amount of torque applied to the primary axle in response to the primary axle torque request, determining a difference between the first amount of torque applied to the primary axle and the primary axle torque request, and based on the difference exceeding a selected threshold, calculating a dynamic fill torque and applying a second amount of torque to the secondary axle via the electric motor according to the calculated dynamic fill torque.

In addition to one or more of the features described herein, the primary axle torque request is a shaped torque request determined based on a vehicle operating mode.

In addition to one or more of the features described herein, the dynamic fill torque is configured as a dynamic fill torque profile, the dynamic fill torque profile calculated by limiting the shaped torque request based on the difference.

In addition to one or more of the features described herein, the primary axle torque request is selected from a torque request provided by a control system, and an intended torque request, the intended torque request based on driver inputs applied to an acceleration pedal, the driver inputs including at least one of a position of the acceleration pedal and a movement of the acceleration pedal, and wherein the difference is between the estimated first amount of torque and the intended torque request.

In addition to one or more of the features described herein, the method is initiated based on at least one activation criteria, the activation criteria including a minimum displacement of a pedal, a minimum magnitude of the first amount of torque being applied to the primary axle, and a minimum rate of change of the first amount of torque.

In addition to one or more of the features described herein, the method includes limiting the second amount of torque based on at least one of: a state of charge of a battery assembly connected to the electric motor, a lateral acceleration, a vehicle operating mode and a capacity of the secondary axle.

In yet another exemplary embodiment, a vehicle system includes a first propulsion system including a combustion engine configured to drive a primary axle of a vehicle, a second propulsion system including an electric motor configured to drive a secondary axle, where the first propulsion system and the primary axle are mechanically independent from the second propulsion system and the secondary axle, and a processing device for executing computer readable instructions from a memory, the computer readable instructions controlling the processing device to perform a method. The method includes detecting a primary torque request for applying torque to the primary axle, estimating a first amount of torque applied to the primary axle in response to the primary axle torque request, determining a difference between the first amount of torque applied to the primary axle and the primary axle torque request, and based on the difference exceeding a selected threshold, calculating a dynamic fill torque and applying a second amount of torque to the secondary axle via the electric motor according to the calculated dynamic fill torque.

In addition to one or more of the features described herein, the primary axle torque request is a shaped torque request determined based on a vehicle operating mode, and the dynamic fill torque is configured as a dynamic fill torque profile, the dynamic fill torque profile calculated by limiting the shaped torque request based on the difference.

In addition to one or more of the features described herein, the primary axle torque request is selected from a torque request provided by a control system, and an intended torque request, the intended torque request based on driver inputs applied to an acceleration pedal, the driver inputs including at least one of a position of the acceleration pedal and a movement of the acceleration pedal, and wherein the difference is between the estimated first amount of torque and the intended torque request.

In addition to one or more of the features described herein, the method is initiated based on at least one activation criteria, the activation criteria including a minimum displacement of a pedal, a minimum magnitude of the first amount of torque being applied to the primary axle, and a minimum rate of change of the first amount of torque.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
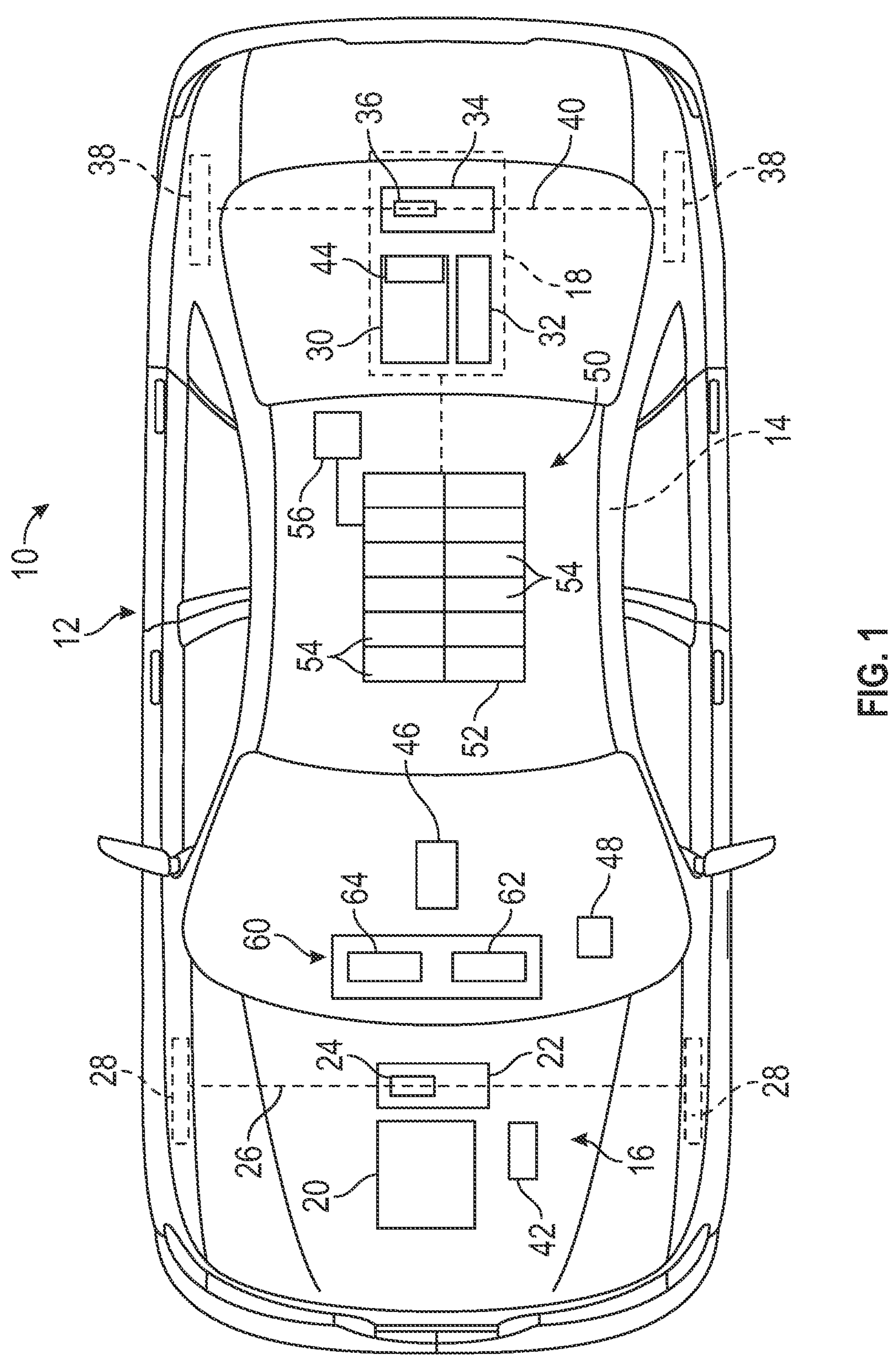
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for control of propulsion of a vehicle. In an embodiment, the vehicle includes a primary axle that is powered by a relatively slow acting propulsion source (e.g., a combustion engine), and a secondary axle that is powered by a relatively fast acting torque source, such as an electric motor. The slow acting propulsion source is decoupled from the fast acting propulsion source (i.e., there is no torque coupling or mechanical coupling that allows for transfer of torque between the respective axles driven by the propulsion sources; the only coupling is through a driving surface or road). The fast acting propulsion source is controlled to compensate for the delayed response of the combustion engine and conform vehicle performance to a torque request. Such control achieves increases to drivability, vehicle responsiveness and overall performance.

An embodiment of a method includes receiving a propulsion request from a driver (e.g., via pressure applied to a pedal and/or pedal movement), and determining a primary axle torque request (an estimation of an amount of torque requested to be applied to the primary axle). The method includes estimating an amount of torque actually being applied to the primary axle ("applied torque" or "delivered torque"), and calculating a difference between the delivered torque and the propulsion request, or a difference between the delivered torque and the primary axle torque request. A dynamic torque fill process is performed to eliminate the difference and thereby compensate for delays in torque delivery.

In an embodiment, the propulsion request corresponds to an intended torque request, which is estimated based on detecting pedal position and/or movement. The intended torque request is estimated based on the detected pedal position and/or movement, in order to capture the driver's actual intentions. In this embodiment, the difference is between the intended torque request and the delivered torque.

Embodiments may be incorporated into various vehicle features and operating modes. For example, embodiments may be used during high performance modes, and incorporated into features such as 12-Volt stop/start, flying start, rolling neutral, dual paddle declutch, and shift to Neutral and back to Drive.

Embodiments described herein present numerous advantages and technical effects. The embodiments provide for improvements in drivability and driver experience by providing an improved transient response as compared to exclusive use of a slower acting propulsion source. For example, the dynamic torque fill method honors the desired transient requirements normally reserved for electric vehicles. This allows the driver to experience the best parts of driving an electric vehicle and the best parts of driving an ICE vehicle (e.g., smoothness and immediacy of torque response, along with the feel and sound of an internal combustion engine). In addition, utilizing a fast responding propulsion source as described herein allows a more dynamic vehicle response with significantly less tip-in bumping or clunking than other vehicles.

Embodiments also provide for efficient use of existing vehicle systems to improve performance and drivability. For example, the dynamic torque fill method may use existing torque request logic as the foundation for torque fill, taking advantage of existing tools and math-based calibration for dynamic targets. In addition, dynamic responses as described herein are achievable without the need to re-calibrate or re-design primary axle controls. Furthermore, the embodiments are able to use significantly less costly and complex hardware architectures (e.g., no e-motor between ICE and transmission) and deliver equivalent or better dynamic responses.

The embodiments are not limited to use with any specific vehicle and may be applicable to various contexts. For example, embodiments may be used with automobiles, trucks, construction equipment, farm equipment, automated factory equipment and/or any other device or system having multiple propulsion systems.

FIG. 1 shows an embodiment of a motor vehicle 10, which includes a vehicle body 12 defining, at least in part, an occupant compartment 14. The vehicle body 12 also supports various vehicle subsystems including propulsion systems 16 and 18, and other subsystems to support functions of the propulsion systems 16 and 18 and other vehicle components, such as a braking subsystem, a suspension system, a steering subsystem, and if the vehicle is a hybrid electric vehicle, a fuel injection subsystem, an exhaust subsystem and others.

In an embodiment, the propulsion systems 16 and 18 form at least part of a hybrid powertrain system that includes at least two independent torque-generating devices. The devices are independent, in that they are independently controllable, and that there is no mechanical coupling within the vehicle 10 and between the devices (beyond any coupling from contact with a driving surface or road).

For example, the propulsion system 16 includes a combustion engine 20 and a transmission system 22 that includes a gearbox 24 for transferring torque from the engine 18 to a drive shaft 26, also referred to as a primary axle 26. The drive shaft 26 is connected to front wheels 28.

The transmission system 22 is configured to operate in various selectable fixed-gear operating modes, and is controllable to operate at gear ratios that match a driver's request for propulsion and an engine operating point. Various differential gear sets and hydraulically-activated clutches are included to effect torque transfer. Examples include an automatic transmission, a dual clutch transmission, a clutchless manual transmission and a manual transmission. The transmission 22 executes upshifts to shift to an operating mode having a lower numerical multiplication ratio (gear ratio) and executes downshifts to shift to an operating mode having a higher numerical multiplication ratio in response to output torque requests. Alternatively, the transmission 22 may be configured as a continuously variable transmission.

The propulsion system 18 is configured as an electric drive system, including at least one electric motor 30 and at least one inverter 32. The inverter 32 (e.g., traction power inverter unit or TPIM) converts direct current (DC) power from a high voltage (HV) battery pack 52 to poly-phase (e.g., two-phase, three-phase, six-phase, etc.) alternating current (AC) power to drive the motor 30.

The motor 30 is connected to a transmission system 34 that includes a gearbox 36 for controlling transfer of torque from the motor 30 to rear wheels 38 via a drive shaft 40. The drive shaft 40 may also be referred to as a secondary axle 40.

One or more processing devices are included to control operation of the propulsion systems. The one or more processing devices are configured to control the torque output of the propulsion systems based on driver torque requests, which may be provided via an accelerator pedal 48.

In an embodiment, an engine control unit (ECU) 42 is configured to receive torque requests and control the engine 20, and a motor control unit (MCU) 44 is configured to control application of torque by the motor 30. A processing device, referred to as a controller 46, may be provided to process torque requests and coordinate control of the propulsion systems as described herein. It is noted that embodiments are not so limited and may use any number or combination of processing devices.

As shown in FIG. 1, the propulsion systems 16 and 18 are configured such that the engine 20 drives the front wheels 28 and the electric motor 30 is usable to provide compensating torque to the rear wheels 38. However, embodiments are not so limited, as there may be any number of propulsion systems and/or motors at various locations (e.g., a motor driving one wheel, twin motors per axle, etc.). For example, the engine 20 may be configured to apply torque to the drive shaft 40 and the motor 30 may be configured to apply torque to the drive shaft 26 (the drive shaft 40 would then be the primary axle and the drive shaft 26 would then be the secondary axle).

The motor 30, as well as other vehicle components, are electrically connected to a battery system 50. The battery system 50 may be configured as a rechargeable energy storage system (RESS).

In an embodiment, the battery system 50 includes a battery assembly such as the battery pack 52. The battery pack 52 includes a plurality of battery modules 54, where each battery module 54 includes a number of individual cells (not shown). The battery system 50 may also include a monitoring unit 56 (e.g., RESS controller) configured to receive measurements from various sensors. Sensors may be provided for measuring various battery and environmental parameters, such as temperature, current and voltages.

The vehicle 10 also includes a computer system 60 that includes one or more processing devices 62 and a user interface 64. The computer system 60 may communicate with the controller 46 and/or other processor(s), for example, to provide commands thereto in response to a user input (e.g., torque commands). The various processing devices, modules and units may communicate with one another via a communication device or system, such as a controller area network (CAN) or transmission control protocol (TCP) bus.

Generally, the response time of an electric machine such as the motor 30 is multiple times faster than that of an internal combustion engine such as the engine 20. As a result, there can be delays in applying the desired torque to the vehicle 10 within a requested time frame. In addition, the delay can result in compromised drivability.

For example, the engine 18 may take 100 to 500 ms to effect a change in engine torque output in response to a request, due to latencies associated with intake manifold fill times, transmission gear changes, and other factors. The response time of the motor 30 is significantly faster (e.g., 10-20 ms).

To account for and compensate for such delays, a processing device (e.g., the controller 46) is configured to perform a dynamic torque fill method that includes monitoring torque on the vehicle 10 and torque requests provided by a driver (or autonomous control system). Upon detection of a torque request, an actual expected torque on a primary axle (e.g., the drive shaft 26) is calculated based on the torque request, and a difference between the torque request and the actual expected torque is calculated. If there is a difference, the method includes controlling a fast torque device such as an electric motor connected to a secondary axle (e.g., controlling the motor 30 connected to the drive shaft 40) to automatically and in real time apply a compensating torque to the secondary axle.

In an embodiment, the torque request is a variable torque request (i.e., has a non-constant torque distribution over a selected time period), which is derived based on a driver input (pedal movement) and other variables. The variable torque request, also referred to as a shaped torque request (STR), is configured as a torque profile that prescribes smooth changes in torque and acceleration. The processing device, in this embodiment, uses the STR as an input, and provides dynamic torque fill by analyzing the STR with respect to measured torque. In another embodiment, the processing device analyzes pedal position and/or movement to determine the actual intent of the driver, and provides dynamic torque fill based on an estimation of the driver's intended torque request.

Figure 2:
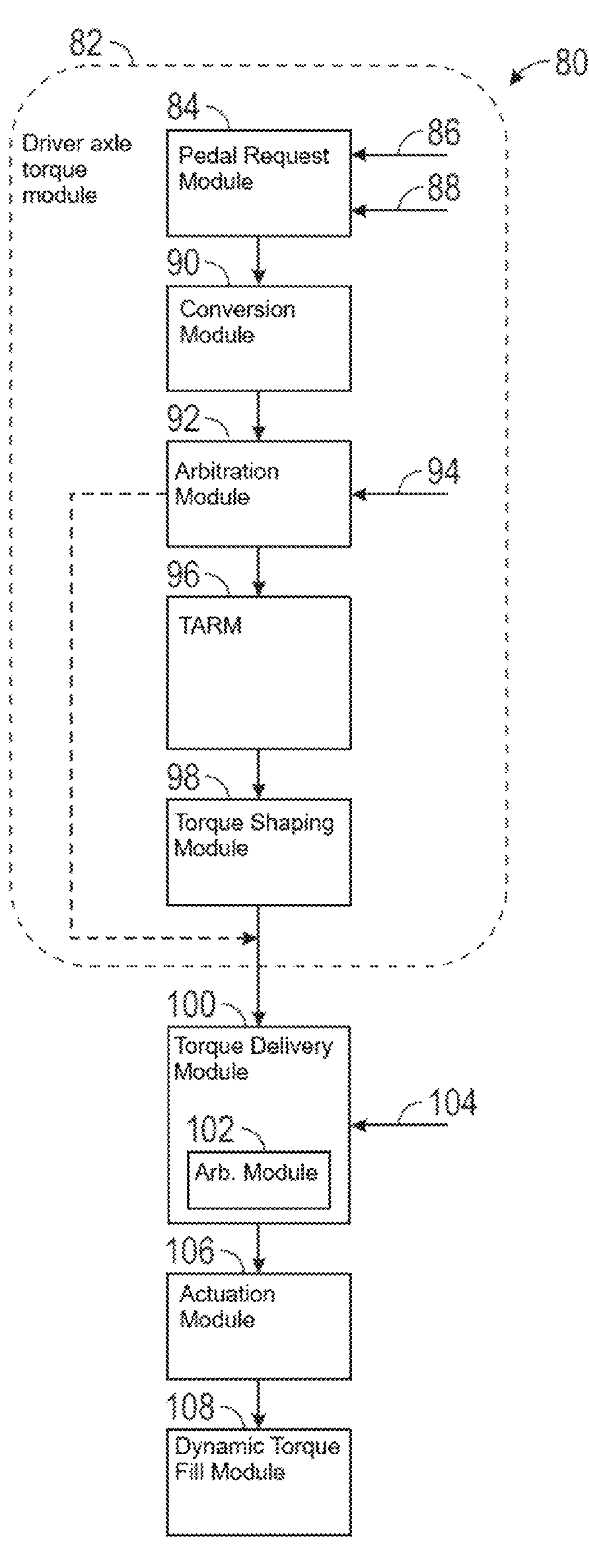
FIG. 2 depicts a torque control system configured to control application of torque to a vehicle, in accordance with an exemplary embodiment.

FIG. 2 depicts an example of a control system 80 configured to perform aspects of torque control and dynamic torque fill described herein. It is noted that the control system 80 is not limited to any specific configuration.

The control system 80 includes a driver axle torque module 82, which determines a primary axle torque request as discussed herein. The driver axle torque module 82 includes a pedal request module 84. The pedal request module 84 determines a pedal torque request (PTR). The pedal torque request may be in terms of a propulsion torque domain (i.e., torque at the crankshaft or other input to the driveline).

The PTR is determined based on a position of the pedal 48 (accelerator pedal position (APP) 86), vehicle speed information 88 and other suitable parameters. The PTR is fed to a conversion module 90, which converts the PTR into the axle torque domain (i.e., torque at the wheels or axles). After being converted into the axle torque domain, the PTR may be referred to as a driver torque request. The conversion module 90 converts the PTR based on, for example, drivetrain losses, the gear ratio selected within the transmission, one or more torque ratios, and/or other suitable parameters.

A torque request arbitration module 92 receives the driver torque request and other torque requests 94 and arbitrates between the received requests. For example, the arbitration module 92 may arbitrate between torque requests related to longitudinal propulsion, such as driver torque requests and cruise torque requests. The arbitration module 92 outputs a winner of such arbitrations. The winner may be output to a transient acceleration request module (TARM) 96 and a torque shaping module 98 discussed further herein.

In some instances, arbitration between longitudinal propulsion torque requests and other torque requests not primarily for longitudinal propulsion purposes (e.g., from chassis control interventions such as stability controls) may result in bypass of the TARM 96 and the torque shaping module 98. For example, if arbitrations between longitudinal propulsion torque requests and other torque requests 94 (i.e., requests not primarily for longitudinal propulsion) result in another torque request 94 winning, the other torque request 94 may be provided directly to a torque delivery module 100 and/or provided to other modules (not shown).

The output of the arbitration module 92 to the TARM 96 is the winner of the arbitration and represents a raw axle torque request (e.g., in Newton-meters) and may be referred to as the driver torque target (DTT). The raw axle torque request is in terms of the axle torque domain (i.e., torque at the wheels or axles). A DTT may be operated upon by the transient acceleration request module (TARM) 96 as further described herein.

The TARM 96 may receive the raw axle torque request or the DTT from the arbitration module 92. The TARM 96 may employ one or more calibration tables or maps relating axle torque requests to torque rate limits for shaping raw axle torque requests into a shaped torque request (STR) as described in further detail herein. Accordingly, the STR may have a different shape for different operating modes (driving modes), and different arbitration winners.

For example, the calibration tables may relate a desired change in axle torque to a desired rate of axle torque change (torque profile) for achieving vehicle acceleration response in accordance with a desired acceleration response. For example, the TARM 96 shapes the raw axle torque request to ensure smooth acceleration, deceleration and changes in torque so that a driver has a pleasant experience. In this way, harsh or sudden changes in torque are prevented to reduce or prevent a "jumpy" or "jerky" feel that may be experienced when the driver exhibits accelerator pedal busyness or dithering, without being perceptively constrained.

It is appreciated that the calibrations and discussion herein are in the torque domain and more particularly in the axle torque domain; however, vehicle performance/drivability development may initially occur in an acceleration domain later converted for controls application into an axle torque domain. Calibration tables as used herein may include calibration elements, calibration arrays, calibration tables or combinations and libraries thereof. A calibration table as described may be adapted for varying driving styles or conditions (driving modes), for example, tour, sport, snow, closed track, four wheel drive low or high, and others. As such, a multi-dimensional library of such calibration tables may be delimited by a driving mode dimension and accessed in accordance therewith.

The TARM 96 may provide the shaped torque request (STR) to a shaping module 98 for additional torque shaping. For example, in powertrains capable of distributing total axle torque among different axles or to individual vehicle corners, the shaping module 98 may further adapt the shaped torque request (STR) for such distribution. The shaped torque request STR is in terms of the axle torque domain (i.e., torque at the wheels or axles).

The shaped torque request STR is passed to the torque delivery module 100 and represents the current delivered or controlled axle torque. The torque delivery module 100 receives the shaped torque request STR and determines a primary axle torque request. The torque delivery module 100 may include an axle torque arbitration module 102 for arbitration with other axle torque requests. The axle torque arbitration module 102 arbitrates between the shaped torque request STR from the shaping module 98 and other axle torque requests such as axle torque interventions 104. The axle torque interventions 104 may come from driveline dynamics management (DDM) primarily imposed for so-called clunk zone or lash zone management to mitigate undesirable driveline gear mesh disturbances (i.e., operator discernable noise and bump) during torque reversals or applications from quiescent states (dynamic clunk control or DCC).

Other axle torque interventions 104 may also include a torque reduction requested by a traction control system when positive wheel slip is detected. Positive wheel slip may occur when axle torque (i.e., torque to the wheels) overcomes friction between wheels and the road surface, and the wheels slip with respect to the road surface in a forward direction. The other axle torque interventions 104 may also include a torque increase request to counteract negative wheel slip, where a tire of the vehicle slips or drags with respect to the road surface in a reverse direction because the axle torque is negative. Other axle torque interventions may also include various brake management requests and other axle torque effecting controls of the powertrain related, for example, to vehicle stability and tracking management, collision avoidance, incipient collision mitigation and preparations, and others. The torque delivery module 100 may generally set the primary axle request (e.g., Nm) equal to the shaped torque request STR unless a higher priority other axle torque request or intervention is required.

The primary axle torque request is passed to an actuation module 106 that determines how the final primary axle request will be achieved. The actuation module 106 may be powertrain specific. For example, the actuation module 106 may be implemented differently or use different control schemes for spark-ignition engines versus compression-ignition engines. For example, in a spark-ignition engine, the actuation module 106 may vary the opening of a throttle valve as a slow actuator that allows for a wide range of torque control. The actuation module 106 may disable cylinders using a cylinder actuator module, which also provides for a wide range of torque control, but may also be slow and may involve drivability and emissions concerns.

In an embodiment, the primary axle torque request is provided for a primary axle driven by a combustion engine, such as the primary axle 26 (FIG. 1). In such embodiments, during operation of the actuation module 106 and application of torque to the primary axle, the primary axle torque request is passed to a dynamic torque fill module 108. Generally, the dynamic torque fill module 108 estimates an amount of torque being applied to the primary axle (e.g., via torque and/or speed sensors) and compares the estimated torque to a torque request.

The torque request may be the primary axle torque request provided to the actuation module 100. In addition, or alternatively, the dynamic torque fill module 108 determines a driver's "intended torque request," which is based on monitoring or detecting driver inputs via an acceleration pedal (e.g., the pedal 48 of FIG. 1). For example, a position sensor, acceleration sensor, movement sensor and/or other suitable sensor(s) are used to detect the nature and extent of the driver's engagement with the pedal 48. The pedal movement and/or position is used to determine the actual intent of the driver (i.e., an amount of torque that the driver intends to request).

The torque fill module 108 acquires sensor information or data from another monitoring system, and estimates the actual amount of torque (also referred to as the "primary torque" or "actual primary torque"), and determines a difference between the primary axle torque request (or the intended torque request) and the actual primary torque. If there is a difference that exceeds a threshold (and optionally if the difference exceeds the threshold for some minimum time), the torque fill module 106 calculates an amount of torque (also referred to as a "secondary torque") based on the difference, and applies the secondary torque to the secondary axle. The secondary torque may be calculated based on other factors and limited as discussed herein.

Figure 3:
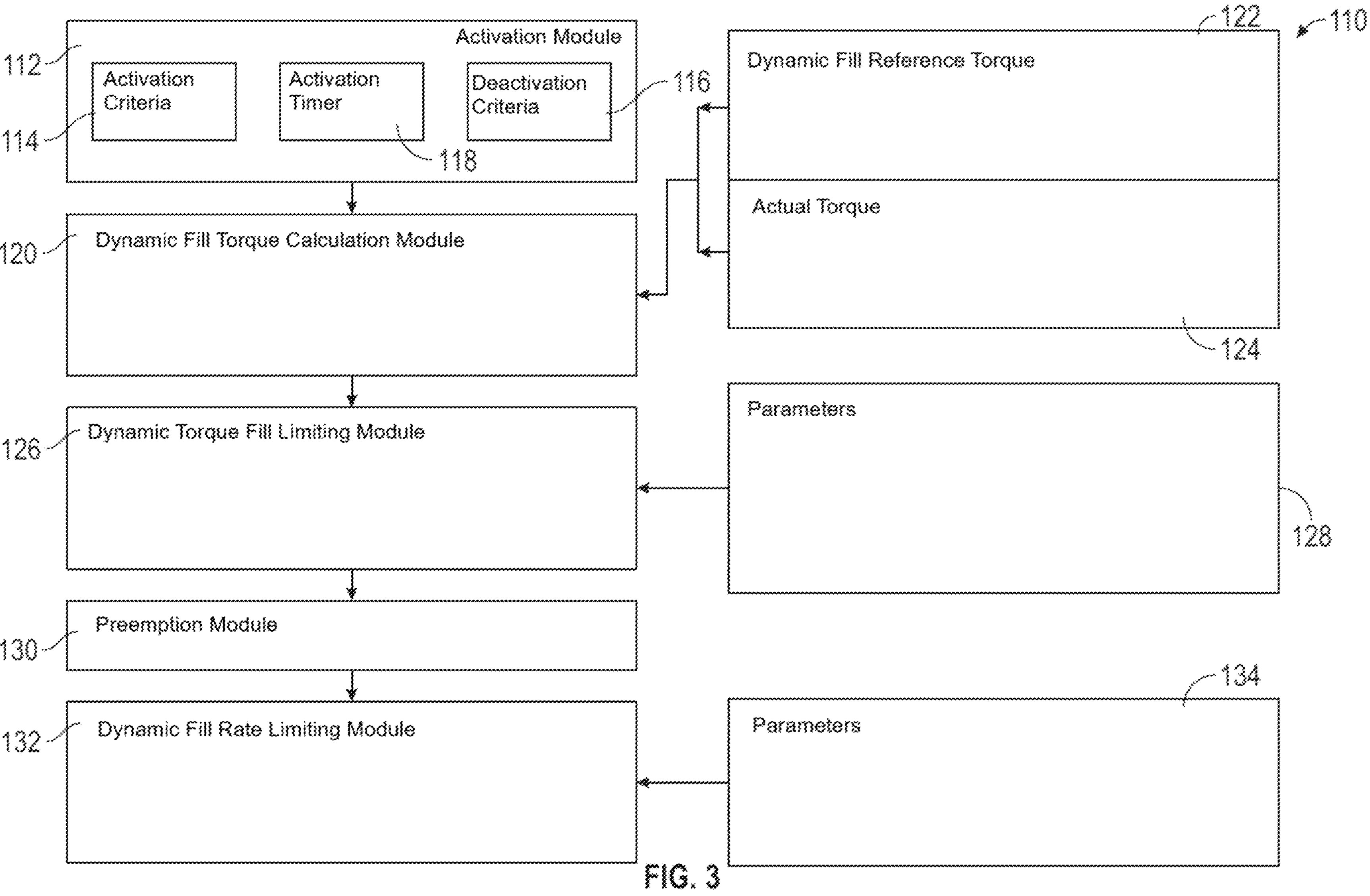
FIG. 3 depicts a processing system configured to perform a dynamic torque fill method, and depicts aspects of the torque fill method, in accordance with an exemplary embodiment.
Figure 4:
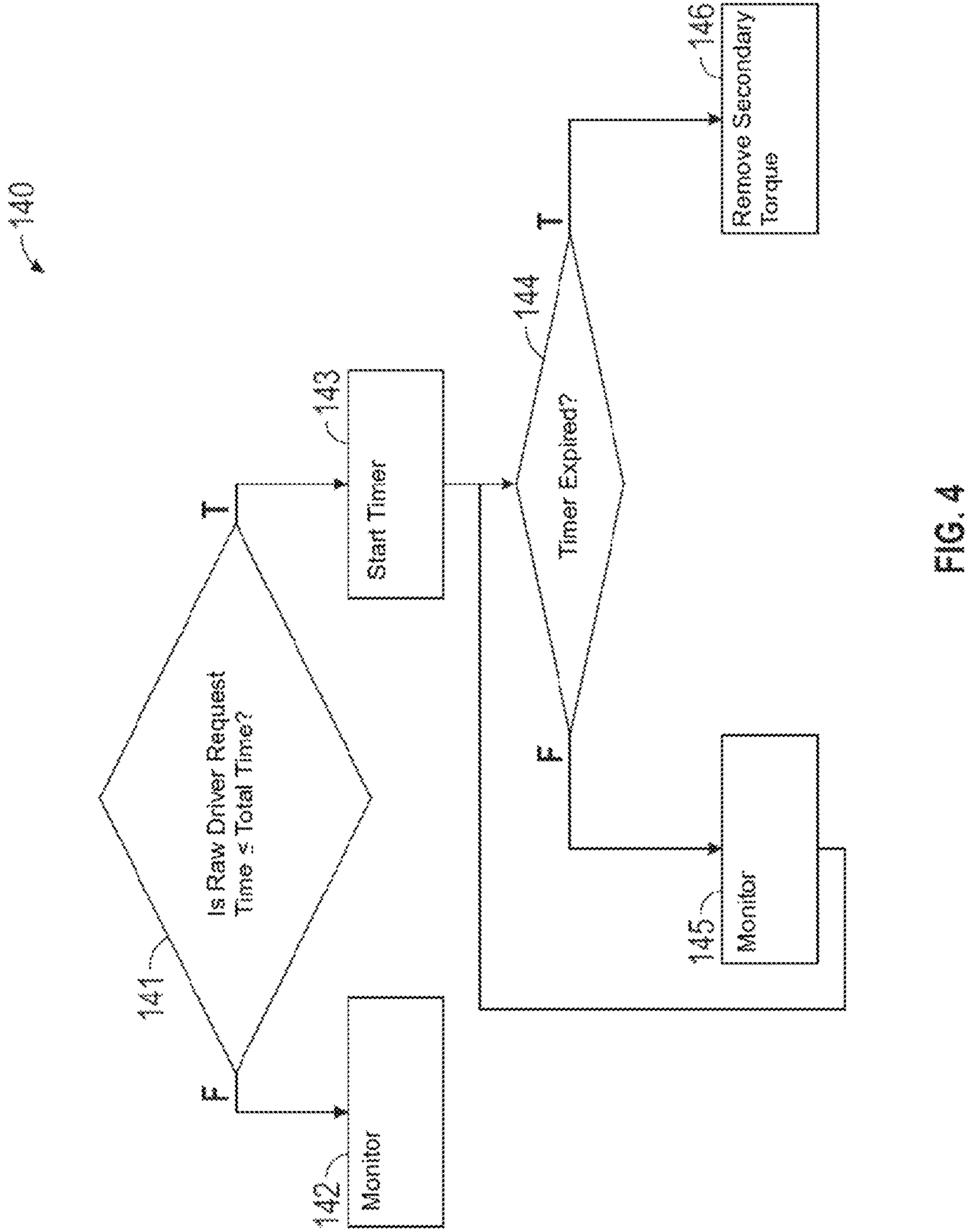
FIG. 4 is a block diagram depicting aspects of the torque fill method of FIG. 3.

FIGS. 3 and 4 illustrate embodiments of a dynamic fill torque system 110 and an associated method of controlling a torque in a vehicle system. Aspects of the associated method may be performed by a processor or processors disposed in a vehicle, such as the controller 46, or a combination of processors. For example, the method can be performed by the ECU 42 in coordination with the MCU 44.

The dynamic fill torque system 110 includes an activation module 112, which determines conditions for initiating or activating the dynamic torque fill method. The activation module 112 compares various conditions to activation criteria 114 and deactivation criteria 116, and also maintains an activation timer 118.

The activation criteria 114 prescribes that the method is activated if it is detected that the driver has engaged an acceleration pedal, or if the system 110 detects a torque request from another vehicle system. For example, the method is activated if the pedal is depressed or moved by a certain extent and/or if a rate of change of the pedal position exceeds a threshold rate. The method may be activated if the pedal movement is increasing using Boolean operators and nested latches based on a separation between a raw pedal measurement and a filtered measurement.

The deactivation criteria 116 is provided to ensure that the dynamic torque fill can be provided without compromising other systems or functions of the vehicle. For example, a minimum state of charge (SOC) value for the battery pack 52 is defined, and the method is shut off or ceased if the SOC reaches or falls below this value, to preserve energy for powering chassis controls and other systems.

A time period may be set using the activation timer 118. The time period, in an embodiment, has a temporal length (minimum time period) that is at least long enough to overcome any initial mismatches or torque conflicts. The time period may correspond to timers set by other vehicle systems (e.g., a "Basic Driver Reset" timer used by the TARM algorithm).

The time period may be subject to a maximum time (i.e., a maximum amount of time that dynamic torque fill is active). In an embodiment, the maximum time period is set based on when the STR approaches the raw axle torque request.

Upon activation, and during the time period defined by the activation timer 118 (subject to minimum and maximum time limits), a dynamic fill torque calculation module 120 calculates a "dynamic fill torque," which is an amount of torque to be applied to the secondary axle. The dynamic fill torque is based on calculating a difference between the actual primary torque and the shaped torque request (STR).

In an embodiment, the module 120 detects any other torque strategies in place (e.g., for stability control) and accounts for such strategies when calculating the dynamic fill torque. This avoids interfering with such other strategies.

The module 120 calculates a "dynamic fill reference torque" 122 based on the primary axle torque request. In an embodiment, the dynamic fill reference torque 122 is a limited version of the primary axle torque request. For example, the module 120 uses the shaped torque request STR from the TARM 96, and reduces the magnitude of the shaped torque based on various factors. The dynamic fill reference torque may be proportional to the primary axle torque request profile.

The module 120 also calculates an actual torque or delivered torque 124, which is an estimation of the torque that is delivered to the primary axle. The actual torque 124 is estimated by measuring the torque being applied to the primary axle. The actual torque 124 is added to a torque value corresponding to any secondary axle torque requests to calculate a total requested torque. The difference between the dynamic fill reference torque 122 and the actual torque 124 is equal to the dynamic fill torque. The dynamic fill torque may be a torque profile determined by limiting the dynamic fill reference torque 122 according to the difference (i.e., subtracting the actual torque 124 from the dynamic fill reference torque 122).

A fast responding propulsion device (e.g., the motor 30) is controlled according to the dynamic fill torque to provide a corresponding amount of secondary torque to the secondary axle (e.g., the secondary axle 40). Ramping logic may be used to provide a smooth transition and maintain continuity in the application of the secondary torque. The secondary torque may be applied until the activation timer expires, or until another condition arises that necessitates deactivation.

Prior to, and/or during application of the secondary torque, the dynamic fill torque may be fed to a dynamic torque fill limiting module 126, which is configured to define a maximum and/or minimum torque limit based on various parameters 128. The limits are used to constrain the dynamic fill torque. Examples of parameters 128 used to determine the limits include the state of charge of the battery pack, estimation of lateral acceleration, calibration limits based on driving mode, chassis controls and secondary axle capacity.

For example, the dynamic fill torque is limited by the maximum and minimum available secondary axle torque. The available secondary axle torque may be determined by detecting other torque applied to the secondary axle (or to be applied) and subtracting such torque from the available torque. The other torque may include strategy torque and can increase with charging and decrease with regen. Torque limits may also be applied based on the torque capabilities of the fast propulsion source, to ensure that fill only occurs when needed and possible. The dynamic fill torque may be limited by multiplexing existing CAN signals to manage the yaw influence of the secondary torque during lateral loads.

The limited dynamic fill torque is then provided to a preemption module 130, which ceases or prevents dynamic torque filling so that existing torque safety monitoring is not affected. The preemption module 130 dynamically calculates limits so as to avoid a constant limit.

FIG. 4 shows an embodiment of a preemption method 140 performed by the preemption module 130. The preemption method 140 includes various steps or stages represented by blocks 141-146.

The preemption method 140 is used to monitor a raw driver request (e.g., the raw axle torque request output from the arbitration module 92) and analyze the raw driver request to ensure that the applied secondary torque does not exceed the raw driver request for a calibrated time period (e.g., 750 ms).

At block 141, the raw driver request is monitored and an amount of time ("raw driver request time") that the raw driver request is non-zero is determined. In addition, amounts of time that torque is applied to the primary axle ("primary torque time") and that the secondary torque is applied ("secondary torque time") are determined. The primary torque time is added to the secondary torque time to derive a total time, which is compared to the raw driver request time. It is then determined whether the raw driver request time exceeds the total time.

At block 142, if the raw driver request time is less than or equal to the total time, the method 140 continues to monitor and determine the amounts of time at block 141.

At block 143, if the raw driver request time exceeds the total time, a timer is started that corresponds to the calibrated time period. At block 144, the timer is monitored. It is determined whether the timer expired.

At block 145, the timer is continuously monitored until the timer expires.

At block 146, upon expiration of the timer, the secondary torque is removed from the secondary axle. The secondary torque may be removed in a gradual manner to avoid tripping any safety monitoring systems.

Referring again to FIG. 3, in an embodiment, the limited dynamic fill torque is provided to a dynamic fill rate limiting module 132, which is configured to define a maximum and/or minimum torque rate limit (i.e., rate of increase or decrease) based on various parameters 134. The limits are used to constrain the rate at which torque is applied to the secondary axle. Examples of parameters used to determine rate limits include the estimation of lateral acceleration, calibration limits based on driving mode, chassis controls and the rate of torque increase or decrease prescribed by the primary axle torque request (e.g., shaped torque request).

It is noted that the system 110 and method are not limited to the above description, as the system 110 may include any number of modules and method steps. For example, the dynamic fill torque may be calculated without using the modules 126, 130 and/or 132, or using a subset of these modules.

Figure 5:
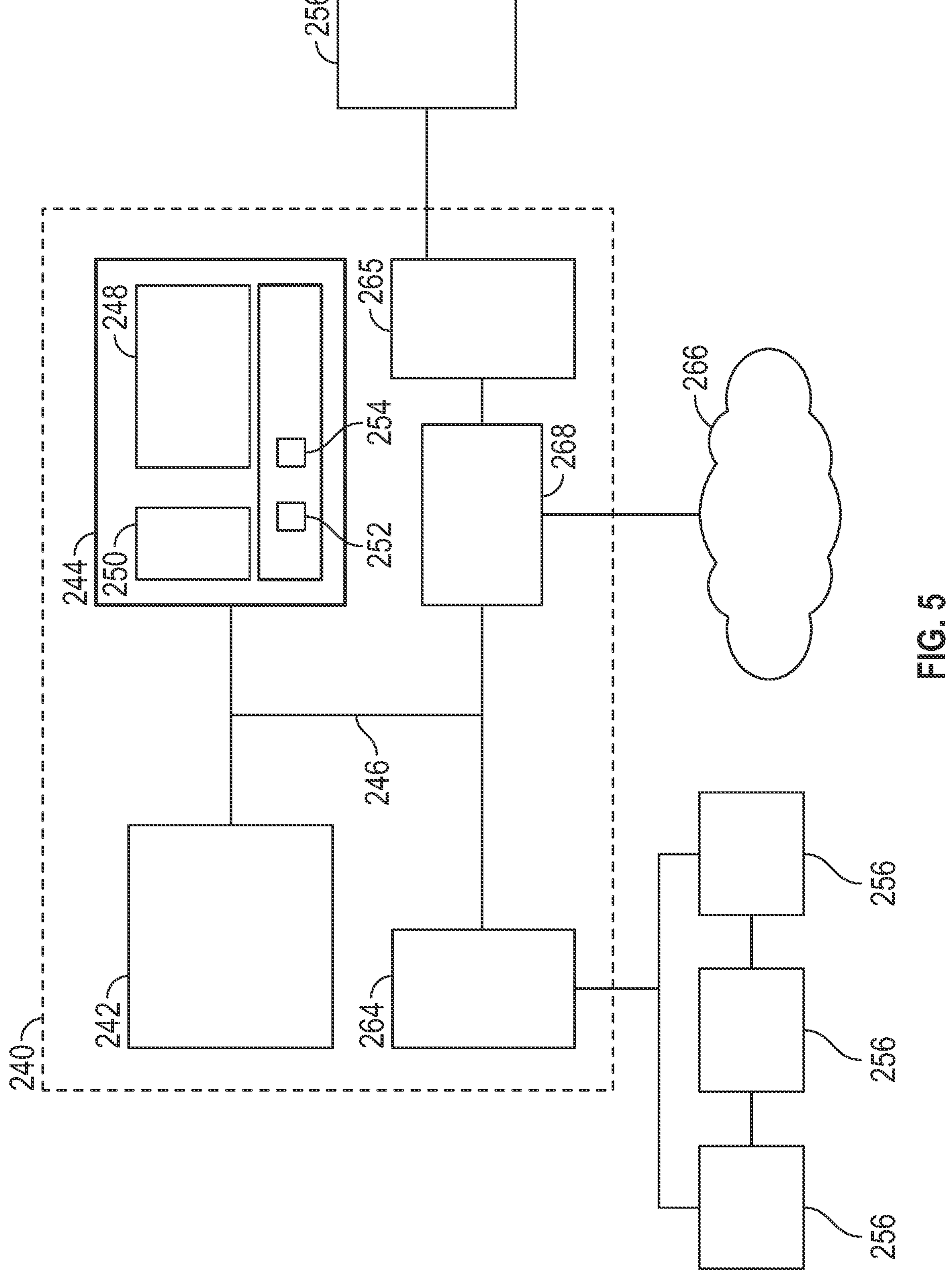
FIG. 5 depicts a computer system in accordance with an exemplary embodiment.

FIG. 5 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (i.e., at least one) of program modules that are configured to carry out functions of the embodiments described herein. For example, the system memory 244 stores various program modules that generally carry out the functions and/or methodologies of embodiments described herein. A module 252 may be included for performing functions related to acquiring signals and data, and a module 254 may be included to perform functions related to torque control as discussed herein. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for controlling torque in a vehicle, comprising:

a controller connected to a first propulsion system and a second propulsion system of the vehicle, the first propulsion system including a combustion engine configured to drive a primary axle, the second propulsion system including an electric motor configured to drive a secondary axle, wherein the first propulsion system and the primary axle are mechanically independent from the second propulsion system and the secondary axle, the controller configured to perform a method including:

receiving a primary axle torque request;

converting the primary axle torque request to a shaped torque request, the shaped torque request prescribing a desired change in a primary axle torque to achieve a requested torque;

determining a time period based on a time at which the shaped torque request approaches the primary axle torque request; and during the time period:

estimating a first amount of torque applied to the primary axle in response to the primary axle torque request;

determining a difference between the first amount of torque applied to the primary axle and the primary axle torque request; and based on the difference exceeding a selected threshold, calculating a dynamic fill torque and applying a second amount of torque to the secondary axle via the electric motor according to the calculated dynamic fill torque.

2. The system of claim 1, wherein the method includes, during the applying the second amount of torque, performing:

monitoring the primary axle torque request and determining a first amount of time during which the primary axle torque request is non-zero;

determining a second amount of time that the first amount of torque is applied to the primary axle;

determining a third amount of time that the secondary amount of torque is applied to the secondary axle;

calculating a sum of the second amount of time and the third amount of time; and based on first amount of time being greater than the sum, removing the second amount of torque from the secondary axle.

3. The system of claim 1, wherein the dynamic fill torque is configured as a dynamic fill torque profile, the dynamic fill torque profile calculated by limiting the shaped torque request based on the difference.

4. The system of claim 1, wherein the primary axle torque request is selected from a torque request provided by a control system, and an intended torque request, the intended torque request based on driver inputs applied to an acceleration pedal, the driver inputs including at least one of a position of the acceleration pedal and a movement of the acceleration pedal.

5. The system of claim 4, wherein the difference is between the estimated first amount of torque and the intended torque request.

6. The system of claim 1, wherein the controller is configured to initiate the method based on at least one activation criteria, the activation criteria including a minimum displacement of a pedal, a minimum magnitude of the first amount of torque being applied to the primary axle, and a minimum rate of change of the first amount of torque.

7. The system of claim 1, wherein the controller is configured to limit a magnitude and/or rate of the second amount of torque.

8. The system of claim 7, wherein the method includes limiting the second amount of torque based on at least one of: a state of charge of a battery assembly connected to the electric motor, a lateral acceleration, a vehicle operating mode and a capacity of the secondary axle.

9. The system of claim 1, wherein the vehicle includes a battery assembly connected to the electric motor, and the controller is configured to cease applying the second amount of torque based on a state of charge of the battery assembly being below a state of charge threshold.

10. The system of claim 1, wherein the method includes calculating a total torque amount by summing the dynamic fill torque and the first amount of torque, and eliminating application of the second amount of torque based on the primary axle torque request exceeding the total torque amount for a selected time period.

11. A method of controlling torque in a vehicle, comprising:

detecting a primary torque request for applying torque to a primary axle of the vehicle, the vehicle including a first propulsion system and a second propulsion system, the first propulsion system including a combustion engine configured to drive a primary axle, the second propulsion system including an electric motor configured to drive a secondary axle, wherein the first propulsion system and the primary axle are mechanically independent from the second propulsion system and the secondary axle;

converting the primary axle torque request to a shaped torque request, the shaped torque request prescribing a desired change in a primary axle torque to achieve a requested torque;

determining a time period based on a time at which the shaped torque request approaches the primary axle torque request; and during the time period:

estimating a first amount of torque applied to the primary axle in response to the primary axle torque request;

determining a difference between the first amount of torque applied to the primary axle and the primary axle torque request; and based on the difference exceeding a selected threshold, calculating a dynamic fill torque and applying a second amount of torque to the secondary axle via the electric motor according to the calculated dynamic fill torque.

12. The method of claim 11, further comprising, during the applying the second amount of torque, performing:

monitoring the primary axle torque request and determining a first amount of time during which the primary axle torque request is non-zero;

determining a second amount of time that the first amount of torque is applied to the primary axle;

determining a third amount of time that the secondary amount of torque is applied to the secondary axle;

calculating a sum of the second amount of time and the third amount of time; and based on first amount of time being greater than the sum, removing the second amount of torque from the secondary axle.

13. The method of claim 11, wherein the dynamic fill torque is configured as a dynamic fill torque profile, the dynamic fill torque profile calculated by limiting the shaped torque request based on the difference.

14. The method of claim 11, wherein the primary axle torque request is selected from a torque request provided by a control system, and an intended torque request, the intended torque request based on driver inputs applied to an acceleration pedal, the driver inputs including at least one of a position of the acceleration pedal and a movement of the acceleration pedal, and wherein the difference is between the estimated first amount of torque and the intended torque request.

15. The method of claim 11, wherein the method is initiated based on at least one activation criteria, the activation criteria including a minimum displacement of a pedal, a minimum magnitude of the first amount of torque being applied to the primary axle, and a minimum rate of change of the first amount of torque.

16. The method of claim 11, further comprising limiting the second amount of torque based on at least one of: a state of charge of a battery assembly connected to the electric motor, a lateral acceleration, a vehicle operating mode and a capacity of the secondary axle.

17. A vehicle system comprising:

a first propulsion system including a combustion engine configured to drive a primary axle of a vehicle;

a second propulsion system including an electric motor configured to drive a secondary axle, wherein the first propulsion system and the primary axle are mechanically independent from the second propulsion system and the secondary axle; and a processing device for executing computer readable instructions from a memory, the computer readable instructions controlling the processing device to perform a method including:

detecting a primary torque request for applying torque to the primary axle;

converting the primary axle torque request to a shaped torque request, the shaped torque request prescribing a desired change in a primary axle torque to achieve a requested torque;

determining a time period based on a time at which the shaped torque request approaches the primary axle torque request; and during the time period:

estimating a first amount of torque applied to the primary axle in response to the primary axle torque request;

determining a difference between the first amount of torque applied to the primary axle and the primary axle torque request; and based on the difference exceeding a selected threshold, calculating a dynamic fill torque and applying a second amount of torque to the secondary axle via the electric motor according to the calculated dynamic fill torque.

18. The vehicle system of claim 17, wherein the dynamic fill torque is configured as a dynamic fill torque profile, the dynamic fill torque profile calculated by limiting the shaped torque request based on the difference.

19. The vehicle system of claim 17, wherein the primary axle torque request is selected from a torque request provided by a control system, and an intended torque request, the intended torque request based on driver inputs applied to an acceleration pedal, the driver inputs including at least one of a position of the acceleration pedal and a movement of the acceleration pedal, and wherein the difference is between the estimated first amount of torque and the intended torque request.

20. The vehicle system of claim 17, wherein the method is initiated based on at least one activation criteria, the activation criteria including a minimum displacement of a pedal, a minimum magnitude of the first amount of torque being applied to the primary axle, and a minimum rate of change of the first amount of torque.

* * * * *